(12) United States Patent
Silver et al.

(10) Patent No.: US 9,181,830 B2
(45) Date of Patent: Nov. 10, 2015

(54) AFTER-TREATMENT SYSTEM AND METHOD FOR SIX-STROKE COMBUSTION CYCLE

(71) Applicant: Caterpillar Inc., Peoria, IL (US)

(72) Inventors: Ronald Silver, Peoria, IL (US); Scott B. Fiveland, Metamora, IL (US); D. Ryan Williams, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 513 days.

(21) Appl. No.: 13/712,254

(22) Filed: Dec. 12, 2012

(65) Prior Publication Data

US 2014/0158087 A1   Jun. 12, 2014

(51) Int. Cl.

| | | |
|---|---|---|
| *F01N 3/10* | (2006.01) | |
| *F02B 17/00* | (2006.01) | |
| *F02D 13/02* | (2006.01) | |

(Continued)

(52) U.S. Cl.
CPC ................ *F01N 3/10* (2013.01); *F01N 3/0814* (2013.01); *F01N 3/0842* (2013.01); *F01N 3/2066* (2013.01); *F02B 75/021* (2013.01); *F02D 13/0273* (2013.01); *F02D 41/0275* (2013.01); *F02B 2275/14* (2013.01); *F02M 25/0707* (2013.01); *F02M 25/0709* (2013.01); *F02M 25/0727* (2013.01); *F02M 2023/008* (2013.01); *Y02T 10/123* (2013.01); *Y02T 10/18* (2013.01); *Y02T 10/24* (2013.01)

(58) Field of Classification Search
CPC .... F02B 17/00; F02B 17/005; F02B 2275/14; F01N 3/10; F01N 3/0814; F01N 3/2066; F01N 3/0842; F02M 25/0727; F02M 25/0707; F02M 25/0709; F02M 2023/008; Y02T 10/18; Y02T 10/123
See application file for complete search history.

(56) References Cited

U.S. PATENT DOCUMENTS

| | | | | |
|---|---|---|---|---|
| 3,986,352 A | * | 10/1976 | Casey | ............................. 60/276 |
| 4,179,892 A | | 12/1979 | Heydrich | |

(Continued)

FOREIGN PATENT DOCUMENTS

| | | | | |
|---|---|---|---|---|
| JP | 03-115743 | | 5/1991 | |
| JP | 2000320372 A | * | 11/2000 | ................ F01N 3/08 |

(Continued)

OTHER PUBLICATIONS

U.S. Appl. No. 13/712,145, filed Dec. 12, 2012.

(Continued)

*Primary Examiner* — Hieu T Vo
(74) *Attorney, Agent, or Firm* — Leydig, Voit & Mayer, Ltd.

(57) ABSTRACT

An internal combustion engine operates on a six-stroke combustion cycle including a first compression stroke, a first power stroke, a second compression stroke, and a second power stroke. A first fuel charge is introduced to a combustion chamber of the engine at a first fuel rate during the first compression and/or first power stroke to produce lean exhaust gasses. A second fuel charge is also introduced to the combustion chamber during the second compression and/or second power stroke to normally produce lean exhaust gasses. Periodically, the second fuel charge can be increased to a second fuel rate to produce stoichiometric rich exhaust gasses. A lean nitrogen oxide trap can be disposed in an exhaust system associated with the engine to temporarily trap nitrogen oxides. Once saturated, the LNT can be periodically regenerated by production of the rich exhaust gasses.

20 Claims, 7 Drawing Sheets

(51) Int. Cl.
  *F02B 75/02*  (2006.01)
  *F02D 41/02*  (2006.01)
  *F01N 3/08*   (2006.01)
  *F01N 3/20*   (2006.01)
  *F02M 25/07*  (2006.01)
  *F02M 23/00*  (2006.01)

(56) References Cited

U.S. PATENT DOCUMENTS

| | | | |
|---|---|---|---|
| 4,736,715 | A | 4/1988 | Larsen |
| 5,224,460 | A | 7/1993 | Havstad et al. |
| 5,284,116 | A | 2/1994 | Richeson, Jr. |
| 5,564,275 | A | 10/1996 | Codan et al. |
| 5,765,372 | A * | 6/1998 | Mitobe et al. .......... 60/301 |
| 6,209,324 | B1 | 4/2001 | Daudel et al. |
| 6,293,092 | B1 | 9/2001 | Ament et al. |
| 6,295,817 | B1 | 10/2001 | Abthoff et al. |
| 6,321,731 | B1 | 11/2001 | Russ et al. |
| 6,324,847 | B1 | 12/2001 | Pierpont |
| 6,332,446 | B1 | 12/2001 | Matsumoto et al. |
| 6,491,016 | B1 | 12/2002 | Buratti |
| 6,557,779 | B2 | 5/2003 | Perr et al. |
| 6,564,758 | B1 | 5/2003 | Enderle et al. |
| 6,619,241 | B2 | 9/2003 | Otterspeer et al. |
| 6,622,693 | B2 | 9/2003 | Arndt et al. |
| 6,705,543 | B2 | 3/2004 | Carroll, III et al. |
| 6,758,174 | B1 | 7/2004 | Fuerhapter |
| 6,772,742 | B2 | 8/2004 | Lei et al. |
| 6,807,956 | B2 | 10/2004 | Gaessler et al. |
| 6,941,746 | B2 | 9/2005 | Tarabulski et al. |
| 6,966,505 | B2 | 11/2005 | Peterson, Jr. |
| 7,031,821 | B2 | 4/2006 | Lewis et al. |
| 7,096,848 | B2 | 8/2006 | Ono et al. |
| 7,143,725 | B1 | 12/2006 | Hu |
| 7,181,902 | B2 | 2/2007 | Naik |
| 7,213,565 | B2 | 5/2007 | Grünaug et al. |
| 7,264,785 | B2 | 9/2007 | Blakeman et al. |
| 7,287,378 | B2 | 10/2007 | Chen et al. |
| 7,418,928 | B2 | 9/2008 | Fiveland |
| 7,422,000 | B2 | 9/2008 | Kesse et al. |
| 7,426,916 | B2 | 9/2008 | Reed et al. |
| 7,500,475 | B2 | 3/2009 | Raymond et al. |
| 7,513,239 | B2 | 4/2009 | Blessing et al. |
| 7,556,017 | B2 | 7/2009 | Gibson |
| 7,597,865 | B2 | 10/2009 | Mori et al. |
| 7,673,590 | B2 | 3/2010 | Reed et al. |
| 7,685,990 | B2 | 3/2010 | Dingle |
| 7,726,268 | B2 | 6/2010 | Kelem et al. |
| 7,763,222 | B2 | 7/2010 | Miyairi et al. |
| 7,867,598 | B2 | 1/2011 | Miyairi et al. |
| 7,891,345 | B2 | 2/2011 | Pierpont |
| 8,051,659 | B2 | 11/2011 | Yamashita et al. |
| 8,096,279 | B2 | 1/2012 | Kuzuyama |
| 8,136,504 | B2 | 3/2012 | Winstead |
| 8,141,352 | B2 | 3/2012 | Tsujimoto et al. |
| 2009/0145382 | A1 | 6/2009 | Kawai |
| 2010/0050963 | A1 | 3/2010 | Ooyama |
| 2010/0212300 | A1 | 8/2010 | Fiveland et al. |
| 2010/0269775 | A1 | 10/2010 | Chandes et al. |
| 2011/0162349 | A1 | 7/2011 | Cheng et al. |
| 2011/0197852 | A1 | 8/2011 | Meyman |

FOREIGN PATENT DOCUMENTS

| | | |
|---|---|---|
| WO | WO 2009/081227 A1 | 7/2009 |
| WO | WO 2010/075165 A1 | 7/2010 |

OTHER PUBLICATIONS

U.S. Appl. No. 13/712,182, filed Dec. 12, 2012.
U.S. Appl. No. 13/711,785, filed Dec. 12, 2012.
U.S. Appl. No. 13/711,753, filed Dec. 12, 2012.
U.S. Appl. No. 13/711,743, filed Dec. 12, 2012.
U.S. Appl. No. 13/711,776, filed Dec. 12, 2012.
U.S. Appl. No. 13/711,761, filed Dec. 12, 2012.
U.S. Appl. No. 13/712,285, filed Dec. 12, 2012.
U.S. Appl. No. 13/712,347, filed Dec. 12, 2012.

* cited by examiner

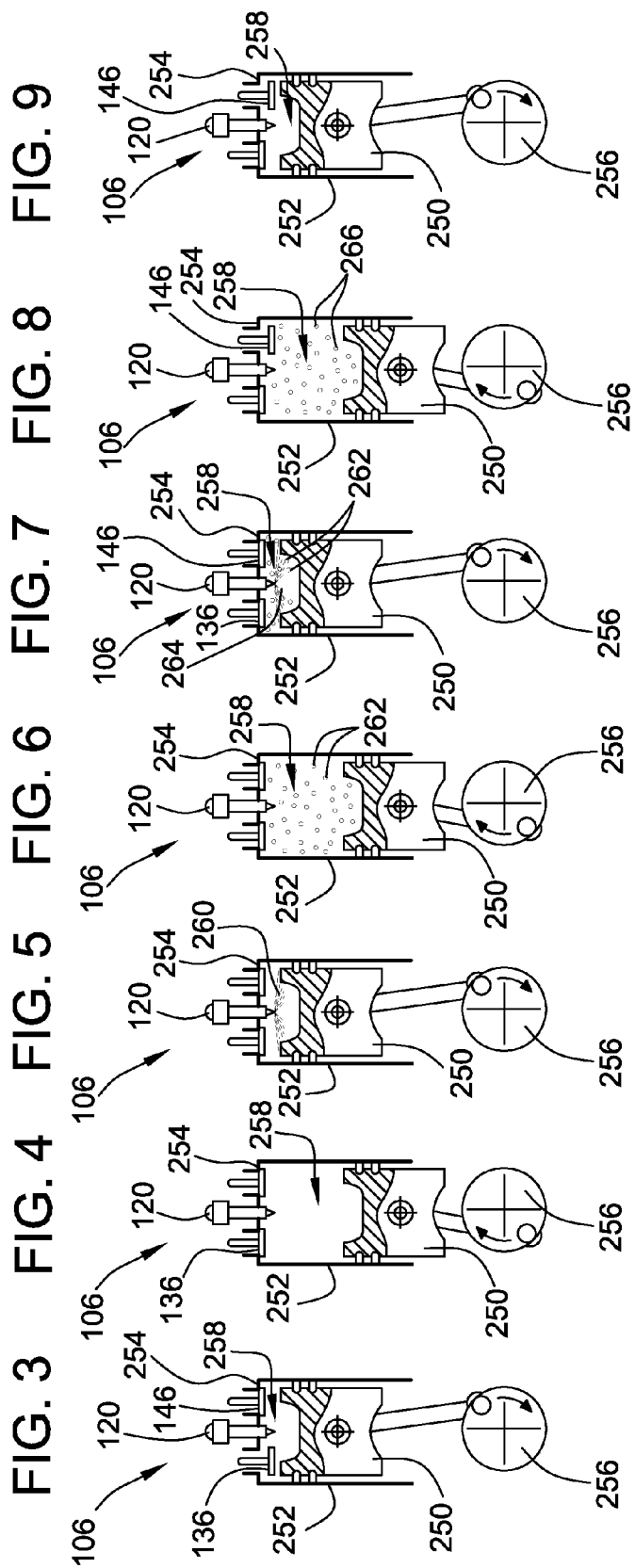

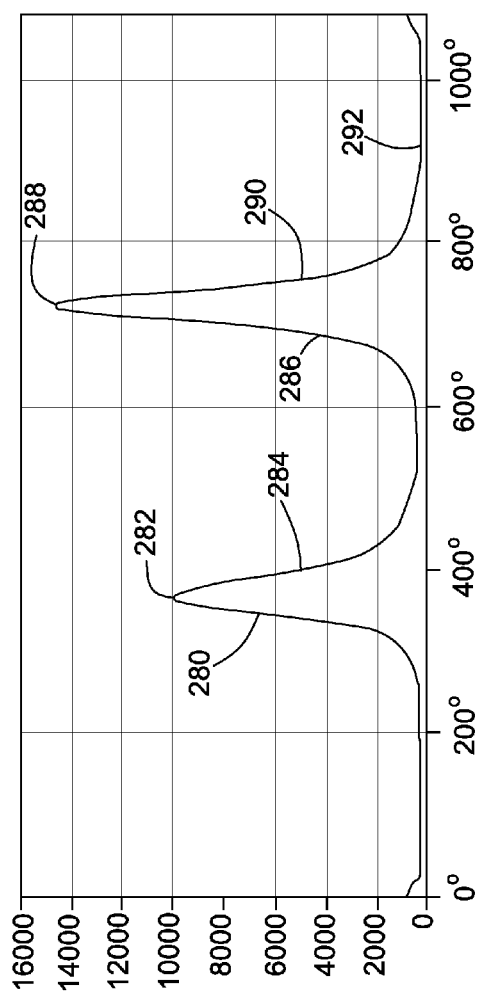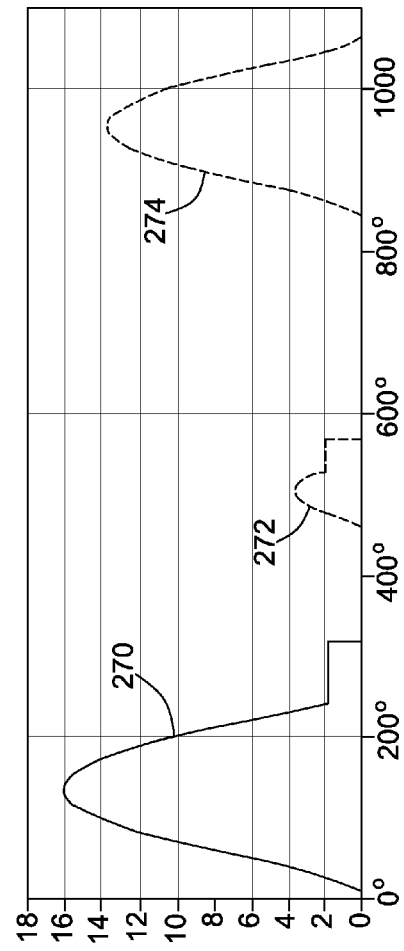

AFTER-TREATMENT SYSTEM AND METHOD FOR SIX-STROKE COMBUSTION CYCLE

TECHNICAL FIELD

This patent disclosure relates generally to internal combustion engines and, more particularly, to internal combustion engines that are configured to operate on a six-stroke internal combustion cycle.

BACKGROUND

Internal combustion engines operating on a six-stroke cycle are generally known in the art. In a six-stroke cycle, a piston reciprocally disposed in a cylinder moves through an intake stroke from a top dead center (TDC) position to a bottom dead center (BDC) position to admit air, an air/fuel mixture, and/or an air/exhaust gas mixture into the cylinder. During a compression stroke, the piston moves towards the TDC position to compress the air or the air mixture. During this process, an initial or additional fuel charge may be introduced to the cylinder by an injector. Ignition of the compressed mixture increases the pressure in the cylinder and forces the piston towards the BDC position during a first power stroke. In accordance with the six-stroke cycle, the piston performs a second compression stroke in which it recompresses the combustion products remaining in the cylinder after the first combustion or power stroke. During this recompression, any exhaust valves associated with the cylinder remain generally closed to assist cylinder recompression. Optionally, a second fuel charge may be introduced into the cylinder during recompression to assist igniting the residual combustion products and produce a second power stroke. Following the second power stroke, the cylinder undergoes an exhaust stroke with the exhaust valve or valves open to substantially evacuate combustion products from the cylinder. One example of an internal combustion engine configured to operate on a six-stroke engine can be found in U.S. Pat. No. 7,418,928. This disclosure relates to a method of operating an engine that includes compressing part of the combustion gas after a first combustion stroke of the piston as well as an additional combustion stroke during a six-stroke cycle of the engine.

Some possible advantages of the six-stroke cycle over the more common four-stroke cycle can include reduced emissions and improved fuel efficiency. For example, the second combustion event and second power stroke can provide for a more complete combustion of soot and/or fuel that may remain in the cylinder after the first combustion event. However, some embodiments of the six-stroke cycle can result in certain tradeoffs, for example, the second combustion event can produce an increased amount other emissions like nitrogen oxides such as NO and $NO_2$, commonly referred to $NO_X$. Additionally, although the six-stroke method provides some advantages, its implementation with other technologies and its compatibility with other technologies has yet to be fully understood.

SUMMARY

In one aspect, the disclosure describes a method of reducing emissions from an internal combustion engine utilizing a six-stroke cycle including a first compression stroke, a first power stroke, a second compression stroke, and a second power stroke. The method introduces a first fuel charge to a combustion chamber during the first compression stroke and/ or first power stroke and combusts the first charge to produce a stoichiometric lean condition in the combustion chamber. The method then introduces a second fuel charge to the combustion chamber during the second compression stroke and/ or second power stroke to produce a second condition stoichiometric lean condition in the combustion chamber and combusts the second charge to produce lean exhaust gasses. The method periodically increases the second fuel charge to produce a stoichiometric rich condition in the combustion chamber and combusts that charge to produce rich exhaust gasses.

In another aspect, the disclosure describes an internal combustion engine system operating on a six-stroke cycle with a first compression stroke and a second compression stroke, and a first power stroke and a second power stroke. The internal combustion engine system includes an internal combustion engine having at least one combustion chamber with a movable piston in a cylinder. A fuel injector is operatively associated with the combustion chamber to introduce fuel. An exhaust system is also operatively associated with the combustion chamber to direct exhaust gasses from the combustion chamber. The engine system includes a lean nitrogen oxide trap (LNT) disposed in the exhaust system that can temporarily trap nitrogen oxides in the exhaust gasses. A controller associated with the engine system controls the fuel injector so as to introduce fuel at a first fuel rate thereby producing a lean air/fuel mixture in the combustion chamber during a first time period. The controller also periodically introduces fuel at a second fuel rate to produce a rich air/fuel mixture in the combustion chamber during a second time period.

In yet another aspect, the disclosure describes a method of operating an internal combustion engine utilizing a six-stroke cycle with a first compression stroke and a second compression stroke, a first fuel charge and second fuel charge, and a first power stroke and a second power stroke. The method introduces fuel to a combustion chamber during the first and second fuel charges at a first fuel rate to produce a stoichiometric lean condition and combusts the first and second fuel charges during a first time period to produce lean exhaust gasses. The exhaust gasses are directed from the combustion chamber to an exhaust system associated with the internal combustion engine. An lean nitrogen oxide trap (LNT) disposed in the exhaust system temporarily traps nitrogen oxides in the lean exhaust gasses. The method also introduces fuel to the combustion chamber during at least one of the first and second fuel charges at a second fuel rate to produce a stoichiometric rich condition and combusts the first and second fuel charges during a second time period to produce rich exhaust gasses. The rich exhaust gasses are directed from the combustion chamber to the exhaust system to regenerate the LNT trap by releasing the nitrogen oxides.

BRIEF DESCRIPTION OF THE DRAWINGS

FIGS. 3-9 are cross-sectional views representing an engine cylinder and a piston movably disposed therein at various points during a six-stroke combustion cycle.

FIG. 10 is a chart representing the lift of the intake valve or valves and exhaust valve or valves in millimeters along the Y-axis as measured against crankshaft angle in degrees along the X-axis for a six-stroke combustion cycle.

FIG. 11 is a chart illustrating a comparison of the internal cylinder pressure along the Y-axis (kPa) as measured against crankshaft angle along the X-axis (degrees) for a six-stroke combustion cycle.

DETAILED DESCRIPTION

This disclosure relates in general to an internal combustion engine and, more particularly, to one adapted to perform a six-stroke cycle for reduced emissions and improved efficiencies. Internal combustion engines burn a hydrocarbon-based fuel or another combustible fuel source to convert the potential or chemical energy therein to mechanical power that can be utilized for other work. In one embodiment, the disclosed engine may be a compression ignition engine, such as a diesel engine, in which a mixture of air and fuel are compressed in a cylinder to raise their pressure and temperature to a point at which auto-ignition or spontaneous ignition occurs. Such engines typically lack a sparkplug that is typically associated with gasoline burning engines. However, in alternative embodiments, the utilization of different fuels such as gasoline and different ignition methods, for example, use of diesel as a pilot fuel to ignite gasoline or natural gas, are contemplated and fall within the scope of the disclosure.

Figure 1:
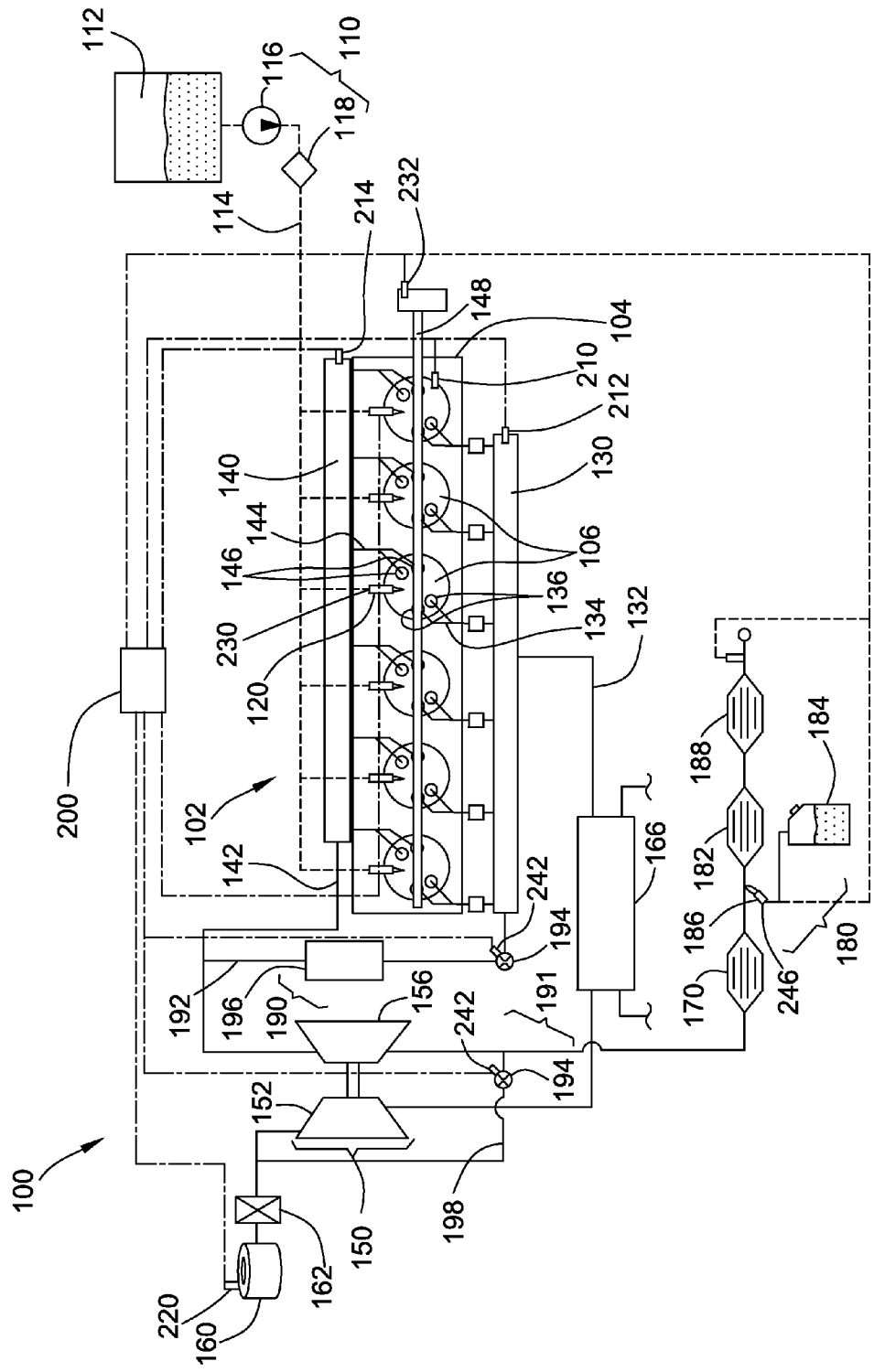
FIG. 1 is a block diagram of an engine system having an internal combustion engine adapted for operation in accordance with a six-stroke combustion cycle and certain associated systems and components for assisting the combustion process, including a selective catalytic reduction after-treatment system.

Now referring to FIG. 1, wherein like reference numbers refer to like elements, there is illustrated a block diagram representing an internal combustion engine system 100. The engine system 100 includes an internal combustion engine 102 and, in particular, a diesel engine that combusts a mixture of air and diesel fuel. The illustrated internal combustion engine 102 includes an engine block 104 in which a plurality of combustion chambers 106 are disposed. Although six combustion chambers 106 are shown in an inline configuration, in other embodiments fewer or more combustion chambers may be included or another configuration such as a V-configuration may be employed. The engine system 100 can be utilized in any suitable application including mobile applications such as motor vehicles, work machines, locomotives or marine engines, and in stationary applications such as electrical power generators.

To supply the fuel that the engine 102 burns during the combustion process, a fuel system 110 is operatively associated with the engine system 100. The fuel system 110 includes a fuel reservoir 112 that can accommodate a hydrocarbon-based fuel such as liquid diesel fuel. Although only one fuel reservoir is depicted in the illustrated embodiment, it will be appreciated that in other embodiments additional reservoirs may be included that accommodate the same or different types of fuels that the combustion process may also burn. Because the fuel reservoir 112 may be situated in a remote location with respect to the engine 102, a fuel line 114 can be disposed through the engine system 100 to direct the fuel from the fuel reservoir to the engine. To pressurize the fuel and force it through the fuel line 114, a fuel pump 116 can be disposed in the fuel line. An optional fuel conditioner 118 may also be disposed in the fuel line 114 to filter the fuel or otherwise condition the fuel by, for example, introducing additives to the fuel, heating the fuel, removing water and the like.

To introduce the fuel to the combustion chambers 106, the fuel line 114 may be in fluid communication with one or more fuel injectors 120 that are associated with the combustion chambers. In the illustrated embodiment, one fuel injector 120 is associated with each combustion chamber but in other embodiments a different number of injectors might be used. Additionally, while the illustrated embodiment depicts the fuel line 114 terminating at the fuel injectors 120, the fuel line may establish a fuel loop that continuously circulates fuel through the plurality of injectors and, optionally, delivers unused fuel back to the fuel reservoir 112. Alternatively, the fuel line 114 may include a fuel collector volume or rail (not shown), which supplies pressurized fuel to the fuel injectors 120. The fuel injectors 120 can be electrically actuated devices that selectively introduce a measured or predetermined quantity of fuel to each combustion chamber 106. In other embodiments, introduction methods other than fuel injectors, such as a carburetor or the like, can be utilized.

To supply the air that is combusted with the fuel in the combustion chambers 106, a hollow runner or intake manifold 130 can be formed in or attached to the engine block 104 such that it extends over or proximate to each of the combustion chambers. The intake manifold 130 can communicate with an intake line 132 that directs air to the internal combustion engine 102. Fluid communication between the intake manifold 130 and the combustion chambers 106 can be established by a plurality of intake runners 134 extending from the intake manifold. One or more intake valves 136 can be associated with each combustion chamber 106 and can open and close to selectively introduce the intake air from the intake manifold 130 to the combustion chamber. While the illustrated embodiment depicts the intake valves at the top of the combustion chamber 106, in other embodiments the intake valves may be placed at other locations such as through a sidewall of the combustion chamber. To direct the exhaust gasses produced by combustion of the air/fuel mixture out of the combustion chambers 106, an exhaust manifold 140 communicating with an exhaust line 142 can also be disposed in or proximate to the engine block 104. The exhaust manifold 140 can communicate with the combustion chambers 106 by exhaust runners 144 extending from the exhaust manifold 140. The exhaust manifold 140 can receive exhaust gasses by selective opening and closing of one or more exhaust valves 146 associated with each chamber.

To actuate the intake valves 136 and the exhaust valves 146, the illustrated embodiment depicts an overhead camshaft 148 that is disposed over the engine block 104 and operatively engages the valves. As will be familiar to those of skill in the art, the camshaft 148 can include a plurality of eccentric lobes disposed along its length that, as the camshaft rotates, cause the intake and exhaust valves 136, 146 to displace or move up and down in an alternating manner with respect to the combustion chambers 106. Movement of the valves can seal and unseal ports leading into the combustion chamber. The placement or configuration of the lobes along the camshaft 148 controls or determines the gas flow through the internal combustion engine 102. As is known in the art, other methods exist for implementing valve timing such as actuators acting on the individual valve stems and the like. Furthermore, in other embodiments, a variable valve timing method can be employed that adjusts the timing and duration of actuating the intake and exhaust valves during the combustion process to simultaneously adjust the combustion process.

To assist in directing the intake air into the internal combustion engine 102, the engine system 100 can include a turbocharger 150. The turbocharger 150 includes a compressor 152 disposed in the intake line 132 that compresses intake air drawn from the atmosphere and directs the compressed air to the intake manifold 130. Although a single turbocharger 150 is shown, more than one such device connected in series and/or in parallel with another can be used. To power the compressor 152, a turbine 156 can be disposed in the exhaust line 142 and can receive pressurized exhaust gasses from the exhaust manifold 140. The pressurized exhaust gasses directed through the turbine 156 can rotate a turbine wheel having a series of blades thereon, which powers a shaft that causes a compressor wheel to rotate within the compressor housing.

To filter debris from intake air drawn from the atmosphere, an intake air filter 160 can be disposed upstream of the compressor 152. In some embodiments, the engine system 100 may be open-throttled wherein the compressor 152 draws air directly from the atmosphere with no intervening controls or adjustability. In other embodiments, an adjustable governor or intake throttle 162 can be disposed in the intake line 132 between the intake air filter 160 and the compressor 152. Because the intake air may become heated during compression, an intercooler 166 such as an air-to-air heat exchanger can be disposed in the intake line 132 between the compressor 152 and the intake manifold 130 to cool the compressed air.

Figure 2:
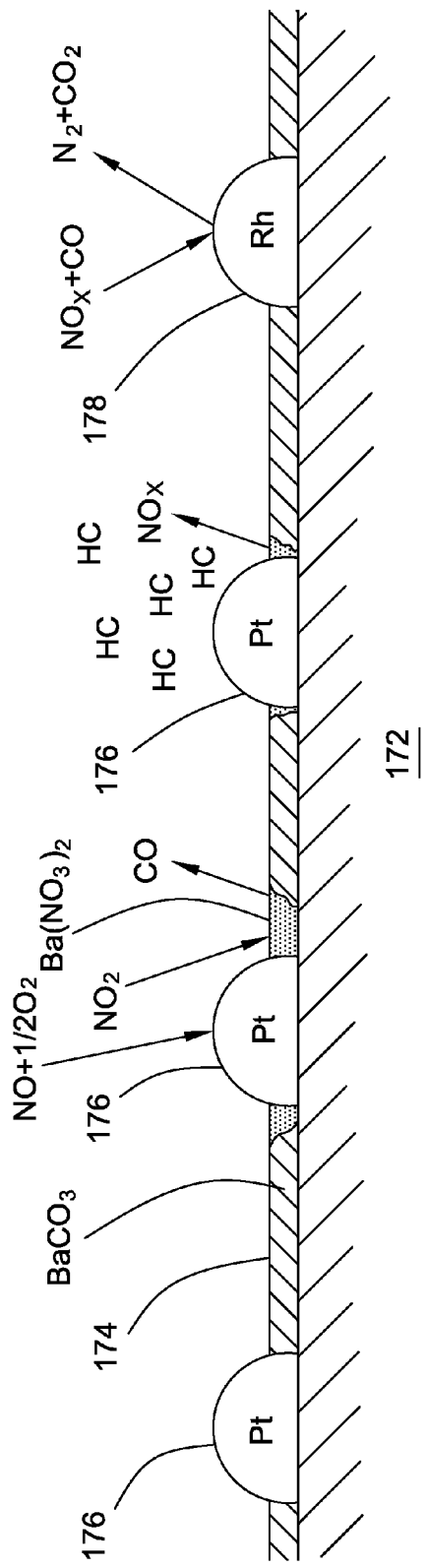
FIG. 2 is schematic cross-sectional view representing the operation of a lean nitrogen oxide trap that may be included as an after-treatment device with the engine system of FIG. 1.

To reduce emissions generated by the combustion of air and fuel, the engine system 100 can include one or more after-treatment or emissions control devices disposed along the exhaust line 142 that reduce emissions in the exhaust gasses before they are discharged to the atmosphere. For example, to remove at least a portion of the nitrogen oxides from the exhaust gasses, a nitrogen oxide adsorber or a lean nitrogen oxide trap (LNT) 170 can be disposed in the exhaust line downstream of the turbine 156. The LNT 170 can trap and store, at least temporarily, nitrogen oxides that are an emission product regulated by the U.S. Government and other governments. LNT's function by absorbing nitrogen oxides from the exhaust gasses under lean conditions, meaning the oxygen concentration is relatively high compared to, for example, hydrocarbons, but release the nitrogen oxides if the oxygen concentration falls. Referring to FIG. 2, to trap nitrogen oxides, the LNT 170 may include a substrate 172 such as alumina that is covered or coated with a material that will function as a nitrogen oxide absorbent 174 by chemically converting with and absorbing nitrogen oxide. Examples of a nitrogen oxide absorbent 174 include barium, barium carbonate, and possibly potassium, sodium and calcium. Also disposed on the substrate 172 can be one or more first LNT catalysts 176 such as a platinum metal group (PGM) catalyst made in part from platinum that assist in trapping the nitrogen oxides by converting less reactive NO to more reactive $NO_2$ molecules. The first LNT catalyst 176 can be formed as a flow-through or pass-through device with the nitrogen oxide absorbent 174 and first LNT catalyst 176 disposed on a honeycombed or baffle-plated substrate 172

In operation, nitrogen monoxide (NO) can react with excess oxygen ($O_2$) in lean exhaust gasses to form nitrogen dioxide ($NO_2$) in the presence of the first LNT catalyst 176.

To absorb nitrogen dioxide formed by the catalytic reaction and other nitrogen dioxide in the exhaust gasses, those molecules can chemically react with and diffuse into the nitrogen oxide absorbent 174. For example, the chemical reaction may convert a portion of the barium carbonate to barium nitrate according to the following representative equation:

$$BaCO_3 + 2NO_2 = Ba(NO_3)_2 + CO \qquad (1)$$ 

The nitrogen oxide absorbent 174 will continue to absorb nitrogen oxides until it reaches capacity and saturates. At that point, the LNT 170 needs to be purged or regenerated by reversing the process to release the absorbed nitrogen oxides. Regeneration can be accomplished by reducing the oxygen concentration of the exhaust gasses relative to the hydrocarbons so that the exhaust gasses are considered rich. As depicted in FIG. 2, lack of oxygen in the LNT 170 causes the nitrogen oxide absorbent 174 to reconvert the barium nitrate to barium carbonate releasing the adsorbed nitrogen oxides from the substrate 172. In an embodiment, additional materials in the LNT can convert the released nitrogen oxides into other products or chemicals. For example, the LNT 170 can also include a second LNT catalyst 178 made from another (PGM) material such as rhodium that can react nitrogen oxides with carbon monoxide in the rich exhaust gasses to form nitrogen and carbon dioxide via the following representative equation:

$$2NO_X + CO = N_2 + CO_2 \qquad (2)$$ 

Because the LNT 170, which is primarily a storage device, may not treat all the nitrogen oxides and does not effect other emissions, the engine system 100 can include other after-treatment systems. One example of an after-treatment device is a selective catalytic reduction (SCR) system 180. In an SCR system 180, the exhaust gasses are combined with a reductant agent such as ammonia or an ammonia precursor such as urea and are directed through a SCR catalyst 182 that chemically converts or reduces the nitrogen oxides in the exhaust gasses to nitrogen and water. For example, the reaction and reduction of nitrogen oxides can occur according to the following representative equation:

$$NH_3 + NO_X = N_2 + H_2O \qquad (3)$$ 

Any suitable material can be used for the SCR catalyst including, for example, vanadium, molybdenum, tungsten, and various zeolites. To provide the reductant agent used in the process, a separate storage tank 184 may be associated with the SCR system 180. An electrically-operated SCR injector 186 in fluid communication with the storage tank 184 can be disposed either in the exhaust line 142 upstream of the SCR catalyst 182 or directly into the SCR catalyst to introduce the reductant agent to the exhaust gasses. The process of introducing reductant agent is sometimes referred to as "dosing." Optionally, to mix the reductant agent and exhaust gasses, various mixers or pre-mixers can be disposed in the exhaust line 142.

Another after-treatment system that may be included in an embodiment is a diesel oxidation catalyst (DOC) 188 made from metals such as palladium and platinum that can convert hydrocarbons and carbon monoxide in the exhaust gasses to carbon dioxide. Representative equations for this reaction are:

$$CO + \frac{1}{2}O_2 \rightarrow CO_2 \qquad (4)$$ 

$$[HC] + O_2 \rightarrow CO_2 + H_2O \qquad (5)$$ 

In contrast to the SCR reaction, the DOC 188, by reacting components that are already present in the exhaust gasses, does not require a reductant agent. In various embodiments, the DOC 188 can be placed either upstream or downstream of the SCR catalyst. Other optional after-treatment systems may include a diesel particulate filter (DPF), three-way catalyst and the like.

A conceptually different process for reducing emissions is an exhaust gas recirculation (EGR) system that mixes intake air with a portion of the exhaust gasses drawn from the exhaust system of the engine. The EGR system forms an intake air/exhaust gas mixture that is introduced to the combustion chambers along with the intake air. In one aspect, addition of exhaust gasses to the intake air displaces the relative amount of oxygen in the combustion chamber during combustion that results in a lower combustion temperature and reduces the generation of nitrogen oxides. Two exemplary EGR systems, a high-pressure EGR system 190 and a low-pressure EGR system 191, are shown associated with the engine system 100 in FIG. 1, but it should be appreciated that these illustrations are exemplary and that either one, both, or neither can be used on the engine. It is contemplated that selection of an EGR system of a particular type may depend on the particular requirements of each engine application.

In the first embodiment, a high-pressure EGR system 190 operates to direct high-pressure exhaust gasses to the intake manifold 130. The high-pressure EGR system 190 includes a high-pressure EGR line 192 that communicates with the exhaust line 142 downstream of the exhaust manifold 140 and upstream of the turbine 156 to receive a portion of the high-pressure exhaust gasses before they've had a chance to depressurize through the turbine. The high-pressure EGR line 192 can direct the exhaust gasses to the intake manifold 130 where they can intermix with the intake air prior to combustion. To control the amount or quantity of the exhaust gasses combined with the intake air, an adjustable EGR valve 194 can be disposed along the high-pressure EGR line 192. Hence, the ratio of exhaust gasses mixed with intake air can be varied during operation by adjustment of the adjustable EGR valve 194. Because the exhaust gasses may be at a sufficiently high temperature that may affect the combustion process, the high-pressure EGR system can also include an EGR cooler 196 disposed along the high-pressure EGR line 192 to cool the exhaust gasses.

In the second embodiment, a low-pressure EGR system 191 includes a lower pressure EGR line 198 that directs low-pressure exhaust gasses to the intake line 132. The low-pressure EGR line 198 communicates with the exhaust line 142 downstream of the turbine 156 so that it receives low-pressure exhaust gasses that have depressurized through the turbine, and delivers the exhaust gasses upstream of the compressor 152 so it can mix and be compressed with the incoming air. The system is thus referred to as a low-pressure EGR system because it operates using depressurized exhaust gasses. To control the quantity of exhaust gasses re-circulated, a second adjustable EGR valve 194 can be disposed in the low-pressure EGR line 198. The exhaust gasses and intake air can be cooled by the intercooler 166 disposed in the intake line 132.

To coordinate and control the various systems and components associated with the engine system 100, the system can include an electronic or computerized control unit, module or controller 200. The controller 200 is adapted to monitor various operating parameters and to responsively regulate various variables and functions affecting engine operation. The controller 200 can include a microprocessor, an application specific integrated circuit (ASIC), or other appropriate circuitry and can have memory or other data storage capabilities. The controller can include functions, steps, routines, data tables, data maps, charts and the like saved in and executable from read-only memory or another electronically accessible storage medium to control the engine system. Although in FIG. 1, the controller 200 is illustrated as a single, discrete unit, in other embodiments, the controller and its functions may be distributed among a plurality of distinct and separate components. To receive operating parameters and send control commands or instructions, the controller can be operatively associated with and can communicate with various sensors and controls on the engine system 100. Communication between the controller and the sensors can be established by sending and receiving digital or analog signals across electronic communication lines or communication busses. The various communication and command channels are indicated in dashed lines for illustration purposes.

For example, to monitor the pressure and/or temperature in the combustion chambers 106, the controller 200 may communicate with chamber sensors 210 such as a transducer or the like, one of which may be associated with each combustion chamber 106 in the engine block 104. The chamber sensors 210 can monitor the combustion chamber conditions directly or indirectly. For example, by measuring the back-pressure exerted against the intake or exhaust valves, the controller 200 can indirectly measure the pressure in the combustion chamber 106. The controller can also communicate with an intake manifold sensor 212 disposed in the intake manifold 130 and that can sense or measure the conditions therein. To monitor the conditions such as pressure and/or temperature in the exhaust manifold 140, the controller 200 can similarly communicate with an exhaust manifold sensor 214 disposed in the exhaust manifold 140. From the temperature of the exhaust gasses in the exhaust manifold 140, the controller 200 may be able to infer the temperature at which combustion in the combustion chambers 106 is occurring.

To measure the flow rate, pressure and/or temperature of the air entering the engine, the controller 200 can communicate with an intake air sensor 220. The intake air sensor 220 may be associated with, as shown, the intake air filter 160 or another intake system component such as the intake manifold. The intake air sensor 220 may also determine or sense the barometric pressure or other environmental conditions in which the engine system is operating. To measure the quality of the exhaust gasses and/or emissions actually discharged by the engine system 100 to the environment, the controller can communicate with a system outlet sensor 222 disposed in the exhaust line 142 downstream of the after-treatment devices.

To further control the combustion process, the controller 200 can communicate with injector controls 230 that can control the fuel injectors 120 operatively associated with the combustion chambers 106. The injector controls 230 can selectively activate or deactivate the fuel injectors 120 to determine the timing of introduction and the quantity of fuel introduced by each fuel injector. To further control the timing of the combustion operation, the controller 200 in the illustrated embodiment can also communicate with a camshaft control 232 that is operatively associated with the camshaft 148. Alternatively, the controller 200 may communicate with and control any other device used to monitor and/or control valve timing.

The controller 200 can also be operatively associated with either or both of the high-pressure EGR system 190 and the low-pressure EGR system 191 by way of an EGR control 242 associated with the adjustable EGR valves 194. The controller 200 can thereby adjust the amount of exhaust gasses and the ratio of intake air/exhaust gasses introduced to the combustion process. In addition to controlling the EGR system, the controller can also be communicatively linked to a SCR injector control 246 associated with the SCR injector 186 to adjustably control the timing and amount of reductant agent introduced to the exhaust gasses.

The engine system 100 can operate in accordance with a six-stroke combustion cycle in which a reciprocal piston disposed in the combustion chamber makes six or more strokes between the top dead center (TDC) position and bottom dead center (BDC) position during each cycle. A representative series of six strokes and the accompanying operations of the engine components associated with the combustion chamber 106 are illustrated in FIGS. 3-9. FIG. 10 depicts valve lift of the exhaust and/or intake valve in millimeters along the Y-axis compared with crank angles in degrees along the X-axis. Lift of the intake valve is indicated in solid lines and lift of the exhaust valve in dashed lines. FIG. 11 depicts cylinder pressure in kilopascals along the Y-axis compared with crank angle in degrees on the X-axis. Additional strokes, for example, 8-stroke or 10-stroke operation and the like, which would include one or more successive recompressions, are not discussed in detail herein as they would be similar to the recompression and re-combustion that is discussed, but are contemplated to be within the scope of the disclosure. The actual strokes are performed by a reciprocal piston 250 that is slidably disposed in an elongated cylinder 252 bored into the engine block, or may alternatively be defined within a cylindrical sleeve installed into a cylinder block. One end of the cylinder 250 is closed off by a flame deck surface 254 so that the combustion chamber 106 defines an enclosed space between the piston 250, the flame deck surface and the inner wall of the cylinder. The reciprocal piston 250 moves between the TDC position where the piston is closest to the flame deck surface 254 and the BDC position where the piston is furthest from the flame deck surface. The motion of the piston 250 with respect to the flame deck surface 254 thereby defines a variable volume 258 that expands and contracts.

Referring to FIG. 3, the six-stroke cycle includes an intake stroke during which the piston 250 moves from the TDC position to the BDC position causing the variable volume 258 to expand. During this stroke, the intake valve 136 is opened so that air or an air mixture may enter the combustion chamber 106, as represented by the positive bell-shaped intake curve 270 indicating intake valve lift in FIG. 10. The duration of the intake valve opening may optionally be adjusted to control the amount of air provided to the cylinder. Referring to FIG. 4, once the piston 250 reaches the BDC position, the intake valve 136 closes and the piston can perform a first compression stroke moving back toward the TDC position and compressing the variable volume 258 that has been filled with air during the intake stroke. It is contemplated that additional features, such as simulating a variable displacement cylinder volume by closing the intake valve before the piston reaches BDC or maintaining the intake valve open past BDC, which can be used to control the amount of air that enters the cylinder, may be used but are not shown or discussed in the present discussion for simplicity. As indicated by the upward slope of the first compression curve 280 in FIG. 11, this motion increases pressure and temperature in the combustion chamber. In diesel engines, the compression ratio can be on the order of 15:1 although other compression ratios are common.

As illustrated in FIG. 5, in those embodiments in which only air is initially drawn into the combustion chamber 106, the fuel injector 120 can introduce a first fuel charge 260 into the variable volume 258 to create an air/fuel mixture as the piston 250 approaches the TDC position. The quantity of the first fuel charge 260 can be such that the resulting air/fuel mixture is lean of stoichiometric, meaning there is an excess amount of oxygen from what is theoretically required to fully combust the quantity of fuel that was provided to the combustion chamber. Under stoichiometric conditions, the proportion of air and fuel is such that all air and fuel will react together with little or no remaining excess of either component. The air/fuel ratio can be expressed as a lambda valve (λ) calculated by the following representative equation:

$$\lambda = (air/Fuel_{actual})/(Air/Fuel_{stoich}) \qquad (6)$$

Accordingly, the lambda valve at stoichiometric conditions equals 1.0 with larger values indicating lean conditions and smaller values indicating fuel rich conditions. For diesel fuel, the air/fuel ratio at stoichiometric conditions is about 14.5:1 to about 14.7:1. In the disclosed six-stroke embodiment, the air/fuel ratio created by the first fuel charge 260 can be about 30:1 to produce a first stoichiometric lean condition.

At an instance when the piston 250 is at or close to the TDC position and the pressure and temperature are at or near a first maximum pressure, as indicated by point 282 in FIG. 11, the air/fuel mixture may ignite. In embodiments where the fuel is less reactive, i.e., the fuel has a lower propensity to auto-ignite when pressurized and heated, such as in gasoline burning engines, ignition may be induced by a sparkplug, by ignition of a pilot fuel or the like. During a first power stroke, the combusting air/fuel mixture expands forcing the piston 250 back to the BDC position as indicated in FIGS. 5 to 6. The piston 250 can be linked or connected to a crankshaft 256 so that its linear motion is converted to rotational motion that can be used to power an application or machine. The expansion of the variable volume 258 during the first power stroke also reduces the pressure in the combustion chamber 106 as indicated by the downward sloping first expansion curve 284 in FIG. 11. At this stage, the variable volume contains the resulting combustion products 262 that may include unburned fuel, even though the air/fuel mixture in the chamber was lean (due to incomplete combustion), in the form of hydrocarbons. The variable volume may further include carbon monoxide, nitrogen oxides such as NO and $NO_2$ commonly referred to as $NO_X$, and excess oxygen from the intake air due to the lean conditions.

Referring to FIG. 7, in the six-stroke cycle, the piston 250 can perform another compression stroke in which it compresses the combustion products 262 in the variable volume 258 by moving back to the TDC position. During the second compression stroke, both the intake valve 136 and exhaust valve 146 are typically closed so that pressure increases in the variable volume as indicated by the second compression curve 286 in FIG. 11. However, in some embodiments, to prevent too large a pressure spike, the exhaust valve 146 may be briefly opened to discharge some of the contents in a process referred to as blowdown, as indicated by the small blowdown curve 272 in FIG. 10. When the piston 250 reaches the TDC position shown in FIG. 6, the fuel injector 120 can introduce a second fuel charge 264 into the combustion chamber 106 that can intermix with the combustion products 262 from the previous combustion event. Referring to FIG. 11, at this instance, the pressure in the compressed variable volume 258 will be at a second maximum pressure 288. The second maximum pressure 288 may be greater than the first maximum pressure 282 or may be otherwise controlled to be about the same or lower than the first pressure.

The quantity of the second fuel charge 264 provided to the cylinder 252, in conjunction with oxygen that may remain within the cylinder, can be selected to approach the stoichiometric condition for combustion but still be slightly lean of stoichiometric. For example, the air/fuel ratio resulting from the second fuel charge 264 can between about 14.7:1 and about 22:1 and, more precisely, between about 17:1 and about 20:1 so as to produce a second stoichiometric lean condition that, although lean, is still closer to stoichiometric than the first stoichiometric condition. Stated in the alternative, the lambda value can be between about 1.1 to about 1.4 and more precisely between about 1.1 to about 1.2. When the piston 250 is at or near the TDC position and the combustion chamber 106 reaches the second maximum pressure 288, the second fuel charge 264 and the previous combustion products 262 may spontaneously ignite. Referring to FIGS. 7 to 8, the second ignition and resulting second combustion expands the contents of the variable volume 258 forcing the piston toward the BDC position resulting in a second power stroke driving the crankshaft 256. The second power stroke also reduces the pressure in the cylinder 252 as indicated by the downward slopping second expansion curve 290 in FIG. 11.

The second combustion event can further incinerate the unburned combustion products from the initial combustion event such as particulate matter, unburned fuel and soot. The quantity or amount of hydrocarbons in the resulting second combustion products 266 remaining in the cylinder 252 may also be reduced. However, because the second combustion event occurs near the stoichiometric point and thus at a higher temperature, it may produce excess nitrogen oxides relative to the hydrocarbons. Referring to FIG. 8, an exhaust stroke can be performed during which the momentum of the crankshaft 256 moves the piston 250 back to the TDC position with the exhaust valve 146 opened to discharge the second combustion products to the exhaust system. Alternatively, additional recompression and re-combustion strokes can be performed in accordance with an 8-stroke, 10-stroke or like operating mode of the engine. With the exhaust valve opened as indicated by the bell-shaped exhaust curve 274 in FIG. 10, the pressure in the cylinder can return to its initial pressure as indicated by the low, flat exhaust curve 292 in FIG. 11.

Referring back to FIG. 1, to prevent the excess nitrogen oxides in the exhaust gasses from reaching the atmosphere, the exhaust gasses can be directed through the LNT 170 in the exhaust channel. The LNT can trap the nitrogen oxides as described above due to the prevailing lean conditions of the exhaust gasses. In the event the LNT becomes saturated, the controller 200 can perform a regenerative control strategy to regenerate the LNT. Specifically, the controller 200 can be programmed with instructions for controlling the fuel injectors 120 so as to adjust and alternate the air/fuel ratio between stoichiometric lean and stoichiometric rich conditions that, as a result, alters the composition of the exhaust gasses.

Figure 12:
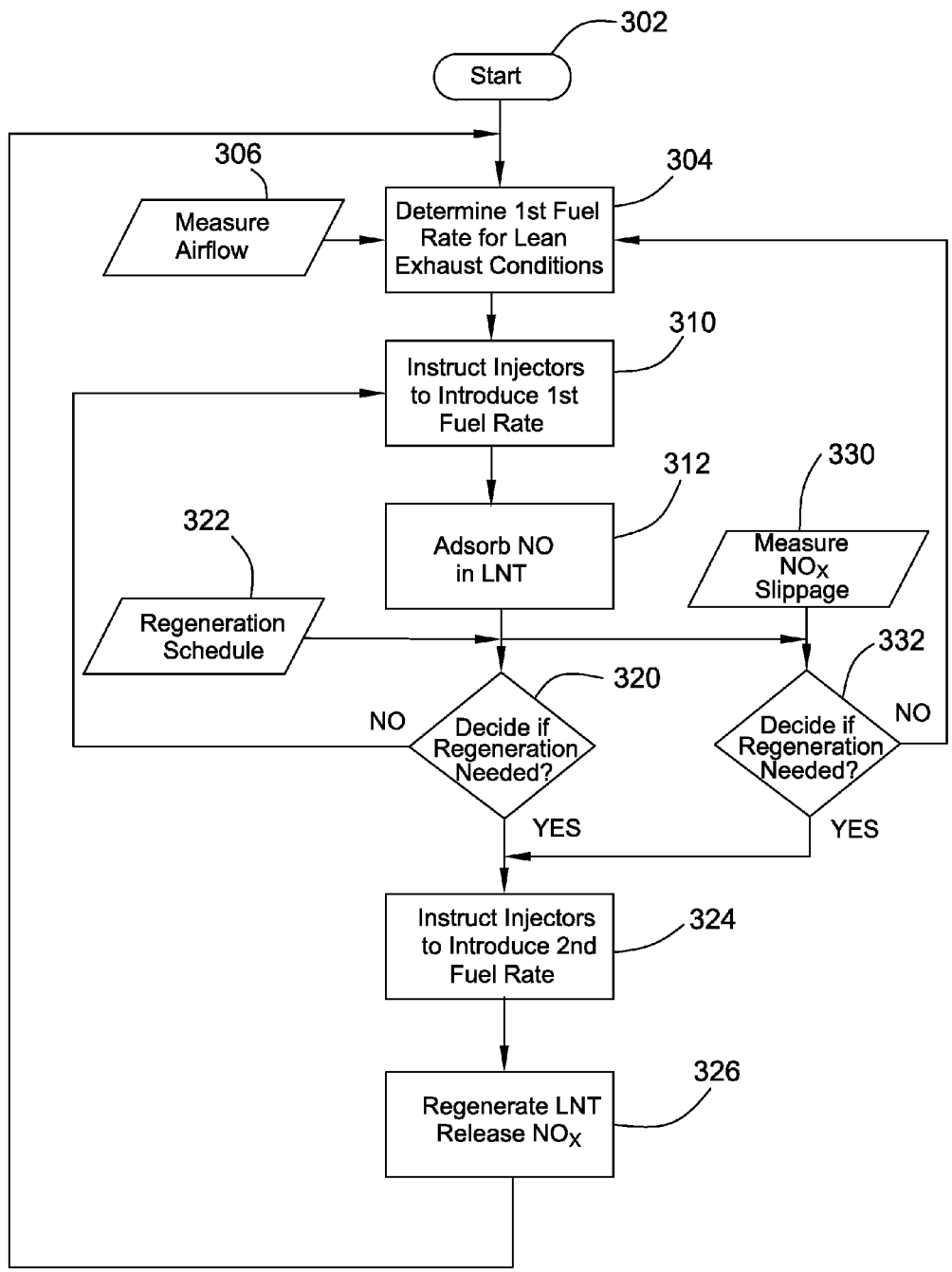
FIG. 12 is a schematic flow chart representing a possible routine or steps for operating a six-stroke engine with a lean nitrogen oxide trap and for occasionally regenerating the lean nitrogen oxide trap.

Referring to FIG. 12, there is illustrated a representative flow chart for performing the regenerative control strategy 300. After an initial startup step 302, the controller may attempt to determine, in a first determination step 304, the amount of fuel to be introduced to the combustion chambers to produce stoichiometric lean conditions therein. The controller can measure the mass airflow rate or other parameters in a first measurement step 306 to assist in making the determination. To operate combustion utilizing the LNT to adsorb nitrogen oxides, the controller in a first injector instruction step 310 can instruct the fuel injectors to introduce fuel at a first fuel rate or quantity in the first and second fuel charges that, after combustion, will result in a lean exhaust condition. In the lean exhaust condition, the exhaust gasses have larger proportions of both nitrogen oxides and oxygen relative to hydrocarbons. Under these oxygen heavy conditions, the LNT in an adsorption step 312 can absorb at least a portion of the excess nitrogen oxides.

Figure 13:
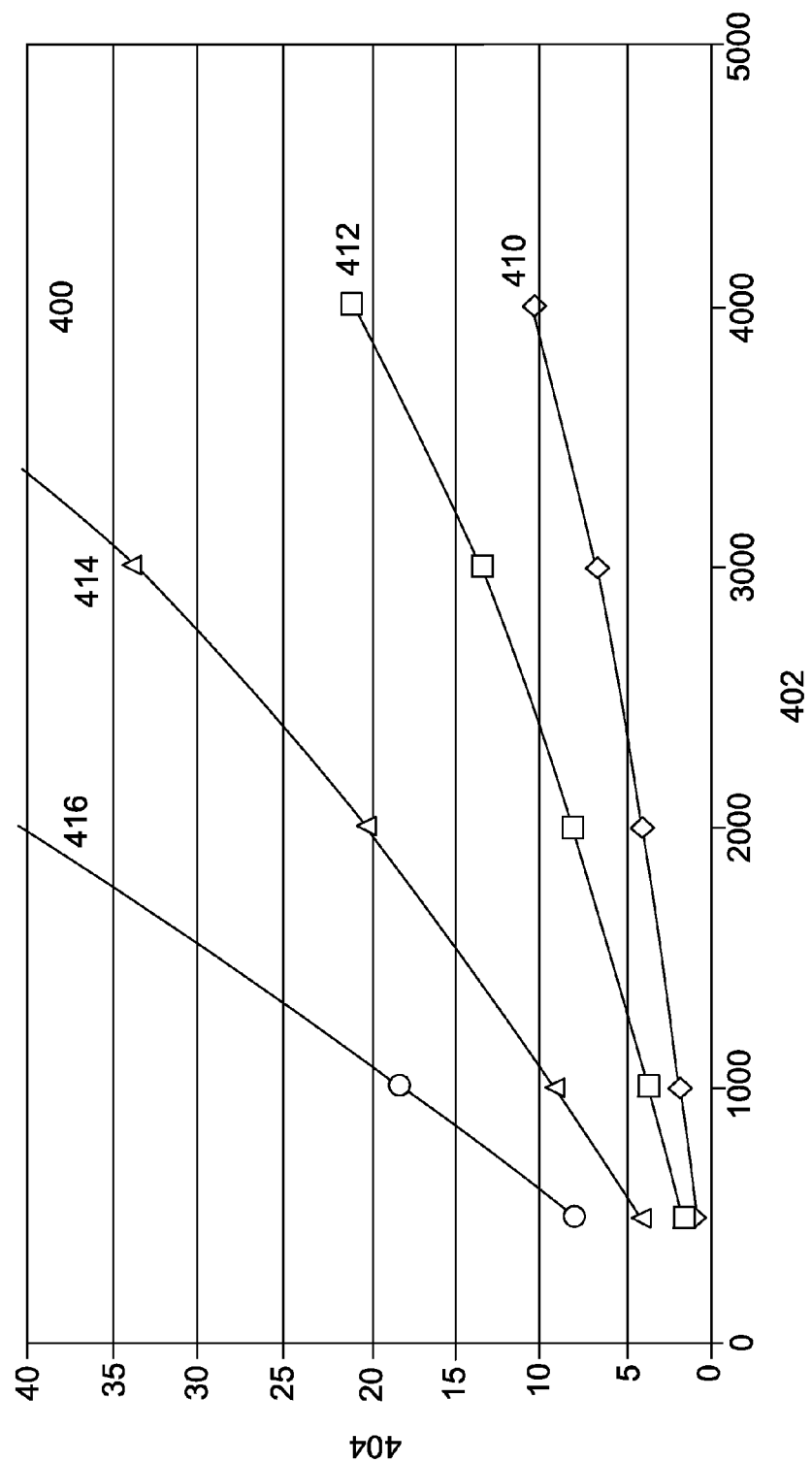
FIG. 13 is a chart comparing volume of a lean nitrogen oxide trap in liters along the Y-axis with quantity of nitrogen oxide generated by the engine and/or trapped by the lean nitrogen oxide trap in parts per million along the X-axis for different regeneration cycles.

To determine if regeneration of the LNT is appropriate, the controller can perform a first decision step 320. For example, the controller can be preprogrammed with a regeneration schedule 322 that correlates the rate of nitrogen oxide generation, the known LNT size or capacity and time. Referring to FIG. 13, there is illustrated an empirically determined chart 400 comparing the concentration of nitrogen oxide in the exhaust gasses out of the engine along the X-axis 402 with the required LNT volume to meet Environmental Protection Agency's Tier IV regulations for large diesel engines requirements along the Y-axis 404 for various regeneration cycles. The regeneration cycles can reflect a first time period during which the LNT adsorbs nitrogen oxides and a second time period during which the LNT regenerates by releasing nitrogen oxides. The first time period will typically exceed the second time period as the LNT is primarily storing nitrogen oxides. The regeneration cycles can include one of a first cycle 410 in which regeneration occurs after every minute of adsorption, a second cycle 412 where regeneration occurs every two minutes, a third cycle 414 where regeneration occurs every five minutes, and a fourth cycle 416 where regeneration occurs after every ten minutes of adsorption. It will be appreciated that the cost of an LNT will typically relate directly to the required LNT volume as indicated along the Y-axis. Information from the chart can be used to generate the regeneration schedule 322 programmed to the controller.

If the first decision step 320 and regeneration schedule 322 assessed therein indicates that regeneration is appropriate, the controller can generate a signal and communicate in a second injector instruction step 324 to the fuel injector to increase the quantity of fuel introduced to a second fuel rate that, after combustion, results in rich exhaust conditions. In an embodiment, to ensure that a portion of the increased fuel quantity is preserved from combustion, the second fuel rate may only apply to the second fuel charge in the six-stroke cycle. In the rich exhaust conditions, the hydrocarbons from unburned fuel may proportionally exceed the quantities of nitrogen oxides and oxygen. When the LNT is subjected to rich exhaust conditions, the LNT conducts a regeneration step 326 where it can release the previously adsorbed nitrogen oxides for conversion in subsequent processing steps. After the regeneration step 326, the control strategy 300 can return to the first determination step 304 to reassess the first rate or quantity of fuel the injectors should introduce to the combustion chambers to bring about the stoichiometric lean conditions. If, however, during the first decision step 320, the controller determines that regeneration is unnecessary, the first decision step can return to the first injector instruction step 310 and continued introducing fuel at the first fuel rate.

In another embodiment of the control strategy 300, to determine if regeneration is appropriate without the predetermined regeneration schedule 322, the controller can measure the nitrogen oxide slippage through the LNT. For example, the controller can perform a nitrogen oxide measuring step 330 using the system out sensor downstream of the LNT to determine the quantity of nitrogen oxides that are passing through the LNT. The controller can assess the quantity in a second decision step 332 to determine if the nitrogen oxide measuring step 330 indicates that the LNT requires regeneration. If the second decision step 332 is yes, the controller can proceed to the injector instruction step 324 to increase the fuel quantity to the second fuel rate resulting in the rich exhaust conditions. If the second decision step 332 is no, the control strategy can return to the first determination step 304 to reassess the quantity of fuel for the first fuel rate to bring about lean exhaust conditions.

INDUSTRIAL APPLICABILITY

The present disclosure is applicable to internal combustion engines operating on a six-stroke cycle. Referring to FIGS. 1 and 12, the engine system 100 can typically operate with the fuel injectors 120 introducing fuel at a first rate to the combustion chambers 106 to produce stoichiometric lean conditions. During this first time period, the controller 200 may be executing the first injector instruction step 310. An advantage of running at stoichiometric lean conditions is that the six-stroke cycle including the second combustion event can combust or burn a significant amount of particulate matter in the combustion chamber. For example, the quantity of the resulting particulate matter may be approximately less than 0.04 grams/kilowatt-hour, which is sufficient to meet the Environmental Protection Agency's Tier IV regulations for large diesel engines. The incineration of particulate matter can eliminate the need for a diesel particulate filter (DPF) that might otherwise be included to filter and trap particulate matter in the exhaust gasses. However, stoichiometric lean conditions tends to increase the amount of nitrogen oxides generated and creates exhaust gasses with oxygen in proportional excess to hydrocarbons.

To temporally trap the nitrogen oxides, the exhaust gasses are directed to the LNT 170 that adsorbs nitrogen oxides until it becomes saturated. To regenerate the LNT, the controller 200 at or near the point of saturation can instruct the injectors 120 to increase the fuel quantity to a second rate that produces stoichiometric rich conditions in the combustion chamber 106. This may be accomplished by executing the second injector instruction step 324. In particular, the fuel injectors may operate at the increased second fuel rate primarily or only during introduction of second fuel charge during the six-stroke cycle so that a suitable portion of the fuel in the form of hydrocarbons is preserved through the first and second combustion events. Because the exhaust gasses produced by combustion at the second fuel rate includes a proportionally greater amount of unburned hydrocarbons to oxygen, i.e., rich exhaust conditions, the LNT 170 in the regeneration step 326 can reverse the adsorption process and release the previously trapped nitrogen oxides.

The timing of the regeneration step initiated by switching from the first fuel rate to the second fuel rate can be accomplished in accordance with an empirically determined regeneration schedule based on the chart depicted in FIG. 13. For example, considering LNT size and cost with fuel costs associated with operating at the stoichiometric rich, second fuel rate, one might determine that the second regeneration cycle 412 produces an optimal result. The second regeneration cycle corresponds to a stoichiometric lean condition for a first time period of about 2 minutes and a stoichiometric rich condition for a second time period of about 10 seconds. In other embodiments, different regeneration cycles may be used, such as running lean exhaust conditions between 1 to 2 minutes and rich exhaust conditions for 10 seconds. The chart 400 also enables selection of the appropriately sized LNT based on the selected regeneration cycle and the concentration of nitrogen oxides in the exhaust gasses.

Figure 14:
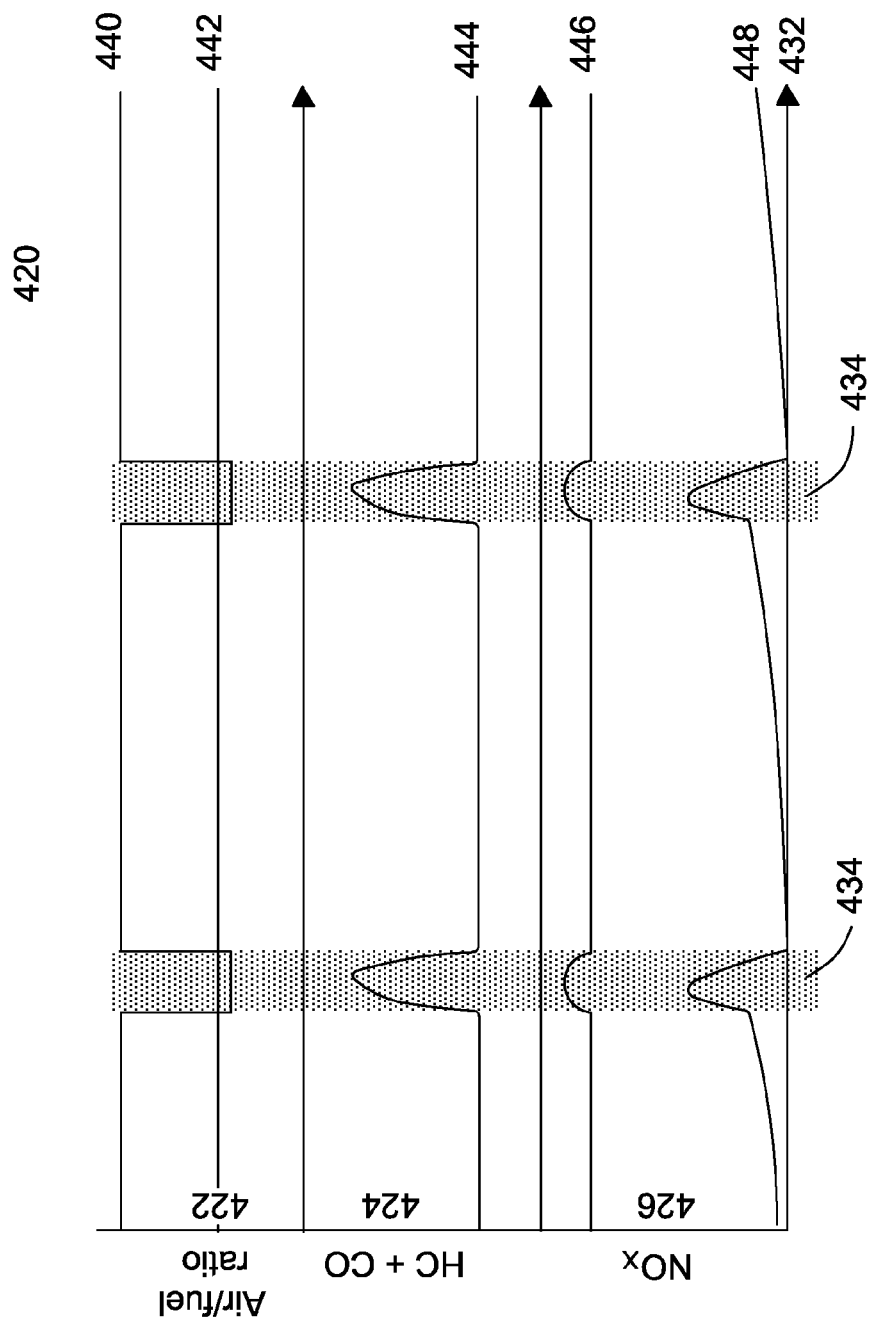
FIG. 14 is a chart representing the performance of various engine parameters and outputs along the Y-axis including air/fuel ratio, hydrocarbon and carbon dioxides in the exhaust gasses, and nitrogen oxides in response to a regeneration cycle depicted in time along the X-axis of the lean nitrogen oxide trap.

FIG. 14 charts the response of various engine parameters and emissions for operating on the 2 minute-10 second regeneration cycle or any other cycle where the first time period corresponding to lean conditions exceeds the second time period corresponding to rich conditions. In the chart 420, the Y-axis represents quantities for various engine parameters including air/fuel ratio, hydrocarbons and carbon dioxide in the exhaust gasses, and nitrogen oxides in the exhaust gasses from the engine and from the LNT. Cycle time 422 is measured along the X-axis and the regeneration periods can be indicated by the two vertical shaded regions 424. During operation under lean conditions, as indicated by line 430, the air/fuel ratio is generally above stoichiometric (lambda=1.0) as indicated by the dashed line 432, but during the regeneration periods 424 falls below stoichiometric to produce rich conditions. Accordingly, during the regeneration periods 424, the hydrocarbons in the exhaust gasses indicated by line 434 peak. Nitrogen oxides discharged directly by the combustion process may remain generally steady as indicated in line 436 but a significant portion can be trapped by the LNT as indicated in line 438 representing nitrogen oxide slippage through the LNT. However during the regeneration periods 424, the released nitrogen oxides causes a peaks in nitrogen oxide slippage 438.

To prevent the released nitrogen oxide from entering the atmosphere during regeneration, the engine system 100 can include one or more after-treatment systems. For example, in one embodiment, the LNT 170 can include a second catalyst such as rhodium that converts released nitrogen dioxides to nitrogen and carbon dioxide according to equation 2 above. In another embodiment, the engine system can include an SCR catalyst 182 that can convert the nitrogen oxides to nitrogen and water according to equation 3 above. To avoid having to store reductant agent in a separate reservoir, in an embodiment the LNT can be configured to convert a portion of the nitrogen oxides and other substances to ammonia ($NH_3$). This can be done by inclusion of an appropriate catalyst material in a third LNT catalyst, such as calcium titanate ($CaTiO_3$), in the LNT or downstream of the LNT. Other suitable materials may include platinum, palladium, rhodium, iridium, copper, chrome, vanadium, titanium, cesium or combinations thereof. The converted ammonia and the remaining nitrogen oxides can proceed to the SCR catalyst downstream of the LNT and convert to nitrogen and water according the reactions described above.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method of reducing emissions from an internal combustion engine utilizing a six-stroke cycle that includes a first compression stroke, a first power stroke, a second compression stroke, and a second power stroke, the method comprising:

introducing a first fuel charge to a combustion chamber during the first compression and/or first power stroke and combusting to produce a stoichiometric lean condition in the combustion chamber;

introducing a second fuel charge to the combustion chamber during the second compression stroke and/or second power stroke to produce a second condition stoichiometric lean condition in the combustion chamber and combusting to produce lean exhaust gasses; and periodically increasing the second fuel charge to produce a stoichiometric rich condition in the combustion chamber and combusting to produce rich exhaust gasses.

2. The method of claim 1, further comprising trapping nitrogen oxides in the lean exhaust gasses with a lean nitrogen oxide trap (LNT).

3. The method of claim 2, further comprising regenerating the LNT by releasing trapped nitrogen oxides in the presence of the rich exhaust gasses.

4. The method of claim 3, further comprising converting the nitrogen oxides to nitrogen and carbon dioxide in the LNT.

5. The method of claim 1, wherein a controller is associated with the internal combustion engine, the controller configured to adjust the second fuel charge so that the stoichiometric lean condition occurs for between about 1 minute to about 2 minutes;
and the stoichiometric rich condition occurs for about 10 seconds.

6. An internal combustion engine system operating on a six-stroke cycle including a first compression stroke and a second compression stroke and a first power stroke and a second power stroke, the internal combustion engine system comprising:
an internal combustion engine including a combustion chamber having a piston movable in a cylinder;
an fuel injector operatively associated with the combustion chamber for introducing fuel to the combustion chamber;
an exhaust system operatively associated with the combustion chamber for directing exhaust gasses from the combustion chamber;
a lean nitrogen oxide trap (LNT) disposed in the exhaust system, the LNT temporarily trapping nitrogen oxides in the exhaust gasses; and
a controller controlling the fuel injector to introduce fuel at a first fuel rate to produce a lean air/fuel mixture in the combustion chamber during a first time period and to introduce a second fuel rate to produce a rich air/fuel mixture in the combustion chamber during a second time period.

7. The system of claim 6, wherein the first time period is longer than the second time period.

8. The system of claim 7, wherein the first time period is between about 1 minute and about 2 minutes and the second time period is about 10 seconds.

9. The system of claim 6, further including a sensor measuring nitrogen oxide slippage through the LNT, the controller communicating with the sensor, the controller further adjusting at least one of the first time period and second time period based on measured nitrogen oxide slippage.

10. The system of claim 6, wherein the fuel injector introduces fuel at the second fuel rate only during the second fuel charges.

11. The system of claim 6, wherein the LNT includes a first LNT catalyst having barium carbonate for trapping nitrogen oxides in the presence of lean exhaust gasses and releasing nitrogen oxides in the presence of rich exhaust gasses; and the LNT includes a second LNT catalyst having rhodium for converting nitrogen dioxide to nitrogen and carbon dioxide.

12. The system of claim 6, further comprising an selective catalytic reduction (SCR) catalyst downstream of the lean nitrogen oxide trap,
wherein the LNT includes a third LNT catalyst converting a first portion of the nitrogen oxides to ammonia for conversion with a second portion of the nitrogen oxides in the SCR catalyst.

13. A method of operating an internal combustion engine utilizing a six-stroke cycle that includes a first compression stroke and a second compression stroke, a first fuel charge and second fuel charge, and a first power stroke and a second power stroke, the method comprising:
introducing a fuel to a combustion chamber during the first and second fuel charges at a first fuel rate to produce a stoichiometric lean condition and combusting the first and second fuel charges during a first time period to produce lean exhaust gasses;
directing lean exhaust gasses from the combustion chamber to an exhaust system associated with the internal combustion engine;
temporarily trapping nitrogen oxides in the lean exhaust gasses with a lean nitrogen oxide trap (LNT) disposed in the exhaust system;
introducing fuel to the combustion chamber during at least one of the first and second fuel charges at a second fuel rate to produce a stoichiometric rich condition and combusting the first and second fuel charges during a second time period to produce rich exhaust gasses;
directing the rich exhaust gasses from the combustion chamber to the exhaust system;
regenerating the LNT trap by releasing the nitrogen oxides in the presence of the rich exhaust gasses.

14. The method of claim 13, wherein the second time period is shorter than the first time period.

15. The method of claim 14, wherein the first time period is between about 1 minute and about 2 minutes and the second time period is about 10 seconds.

16. The method of claim 13, further comprising measuring nitrogen oxide slippage through the lean nitrogen oxide trap and adjusting at least one of the first and second time periods based on the measured nitrogen oxide slippage.

17. The method of claim 13, wherein the stoichiometric lean condition has an air/fuel ratio of between about 15:1 and about 22:1, and the stoichiometric rich condition has an air/fuel ratio of less than 14.7:1.

18. The method of claim 13, wherein the second fuel rate is only introduced during the second fuel charge.

19. The method of claim 13, further comprising converting the nitrogen oxides to nitrogen and carbon dioxide in the LNT.

20. The method of claim 13, wherein a volumetric capacity of the LNT is selected based in part on duration of the first time period and the second time period.

* * * * *